US008539121B2

(12) United States Patent
Thomas

(10) Patent No.: US 8,539,121 B2
(45) Date of Patent: Sep. 17, 2013

(54) DEVICE FOR CONNECTING AN ELECTRONIC UNIT TO SCREENS OF DIFFERENT TYPES WITHOUT DISTINCTION, AND A CORRESPONDING SCREEN

(75) Inventor: Benjamin Thomas, Saint-Ouen l'Aumone (FR)

(73) Assignee: Morpho, Paris (FR)

( * ) Notice: Subject to any disclaimer, the term of this patent is extended or adjusted under 35 U.S.C. 154(b) by 502 days.

(21) Appl. No.: 11/921,660

(22) PCT Filed: Jun. 1, 2006

(86) PCT No.: PCT/FR2006/001242
§ 371 (c)(1),
(2), (4) Date: Jan. 16, 2008

(87) PCT Pub. No.: WO2006/131624
PCT Pub. Date: Dec. 14, 2006

(65) Prior Publication Data

US 2009/0128480 A1 May 21, 2009

(30) Foreign Application Priority Data

Jun. 8, 2005 (FR) ..................................... 05 05809

(51) Int. Cl.
*G06F 13/12* (2006.01)
*G06F 13/00* (2006.01)

(52) U.S. Cl.
USPC ............................................ 710/62; 710/305

(58) Field of Classification Search
USPC ............................................................ 710/62
See application file for complete search history.

(56) References Cited

U.S. PATENT DOCUMENTS

2002/0049879 A1* 4/2002 Eyer ............................ 710/305
2002/0118762 A1* 8/2002 Shakiba et al. .......... 375/240.28
2002/0163598 A1* 11/2002 Pasqualino .................... 348/725
2004/0095509 A1* 5/2004 Okamoto et al. ............ 348/462
2005/0008323 A1* 1/2005 Han ................................ 386/37
2005/0113948 A1* 5/2005 Own ............................... 700/94

OTHER PUBLICATIONS

Lemme et al., "Digital vom Computer zum Monitor DVI-Schnittstelle spart Kosten und erhöht die Bildschärfe", Elektronik, Weka Fachezeitschriftenverlag, Poing, DE, vol. 48, No. 20, Oct. 5, 1999, pp. 80-83, XP000927623 ISSN: 0013-5658 p. 82, colonne de droite.

"Digital Visual Interface DVI", Paper Digital Display Working Group, Apr. 2, 1999, pp. 1-76, XP002948299.

* cited by examiner

*Primary Examiner* — Titus Wong
(74) *Attorney, Agent, or Firm* — Muncy, Geissler, Olds & Lowe, PLLC

(57) ABSTRACT

The invention relates to a device for connecting an electronic unit (1) to different types of screen, the device comprising an external connection connector (6) possessing connector elements (10) distributed in a first series for connection to the display members (17, 21) of screens, and a second series for connection to a loudspeaker (18) of a screen of a first type (2) or to the display member (21) of a screen of a second type (3), the device comprising a display line (7) connected to the connector elements of the first series, a sound line (8) connected to a switch member (11) connected to the connector elements of the second series, and a detector element (12) connected to the connector elements of the connector and to the switch member to cause the switch member to take up a connection state when the connected screen is of the first type and a disconnection state when the connected screen is of the second type. The invention also relates to a screen for connection to the device.

7 Claims, 2 Drawing Sheets

DEVICE FOR CONNECTING AN ELECTRONIC UNIT TO SCREENS OF DIFFERENT TYPES WITHOUT DISTINCTION, AND A CORRESPONDING SCREEN

The present invention relates to a device for connecting an electronic unit, without distinction, either to a screen of a first type or to a screen of a second type. By way of example, the electronic unit is a computer terminal or any other electronic device that needs to be associated with a screen.

BACKGROUND OF THE INVENTION

Such an electronic unit generally comprises a display line and a sound line for connection respectively to an external screen and to external loudspeakers.

The display line is connected to a connection device comprising an external connection connector for co-operating with an external connection connector of the screen. The connection connectors include connector elements, such as pins or plugs that are arranged in compliance with the digital visual interface (DVI) standard. This standard is very widespread at present and is specific to display purposes, enabling the display line to be connected to display members of different sizes. The connector elements are thus distributed in a first series for connecting the display line of the electronic unit to the display member of the screen regardless of the size of the screen, and a second series for connecting only the display line to the display member of the screen when the display member is of a size equal to or greater than 21 inches (") (53.34 cm). Screens having a display member of a size less than 21" are nevertheless more widespread.

The sound line is connected to the loudspeakers via one or more dedicated connectors generally of the "jack" type.

The risk of erroneous or forgotten connection increases with increasing number of connections, so the presence of a plurality of connectors is a drawback when the electronic unit and the components connected thereto need to be installed in a short period of time. This risk is further increased when the installation is performed by people with little training. In addition, during maintenance operations, the time needed to verify the connections increases the time required to perform maintenance.

OBJECT OF THE INVENTION

It would therefore be advantageous to have means enabling the operations of connecting an electronic unit to external audio and video components to be simplified.

BRIEF DESCRIPTION OF THE INVENTION

To this end, the invention provides a device for connecting an electronic unit, without distinction, either to a screen of a first type or to a screen of a second type, both types of screen possessing a display member, the screen of the first type also being fitted with at least one loudspeaker, the connector device comprising a display line, a sound line, and an external connection connector possessing connector elements distributed in a first series for connection to the display members of screens, and a second series for connection to the loudspeaker of the screen of the first type or to the display member of the screen of the second type, the display line being connected to the connector elements of the first series, the sound line being connected to an input of a switch member that has an output connected to the connection elements of the second series and that is controlled by a detector element for detecting the type of screen connected, the detector element being connected to connector elements of the connector and to the switch member to control the switch member to take up a connection state in which it connects the sound line to the connector when the connected screen is of the first type, and a disconnection state in which it disconnects the sound line from the connector when the connected screen is of the second type.

Thus, when a screen of the first type is connected to the connection device, the switch member connects the sound line to the loudspeaker. As a result the connector elements that are unused by the display member of a screen of the first type, are used instead to convey an electrical signal to the loudspeaker. In contrast, when a screen of the second type is connected to the connection device, the switch member disconnects the sound line from the second series of connector elements so that the sound line is not connected to the display member of a screen of the second type. There is thus no risk of damaging the display member of a screen of the second type by delivering electrical signals thereto at levels that are not compatible with operation thereof.

Preferably, the switch member in its sound-line disconnection state connects the display line to the second series of connection elements of the external connection connector.

Thus, when a screen of the second type is connected to the connection device, the switch member connects the display line to the display member of the screen via the second series of connector elements so that it can operate normally.

In particular embodiments, the detector element comprises a measurement element for measuring an electrical characteristic between the connector elements to which it is connected, or the detector element is associated with a member for recovering an identity of the screen for connection.

These embodiments are particularly simple, and enable the type of screen connected to be detected reliably.

The invention also provides a screen comprising a display member, at least one loudspeaker, and an external connection connector. The display member is connected to a first series of connector elements of the external connection connector, and the loudspeaker is connected to a second series of connector elements of the external connection connector.

Such a screen can be connected to the above-described connection device and can deliver sound. The screen can also be simple in structure and the loudspeaker can receive analog signals directly.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF THE INVENTION

Figure 1:
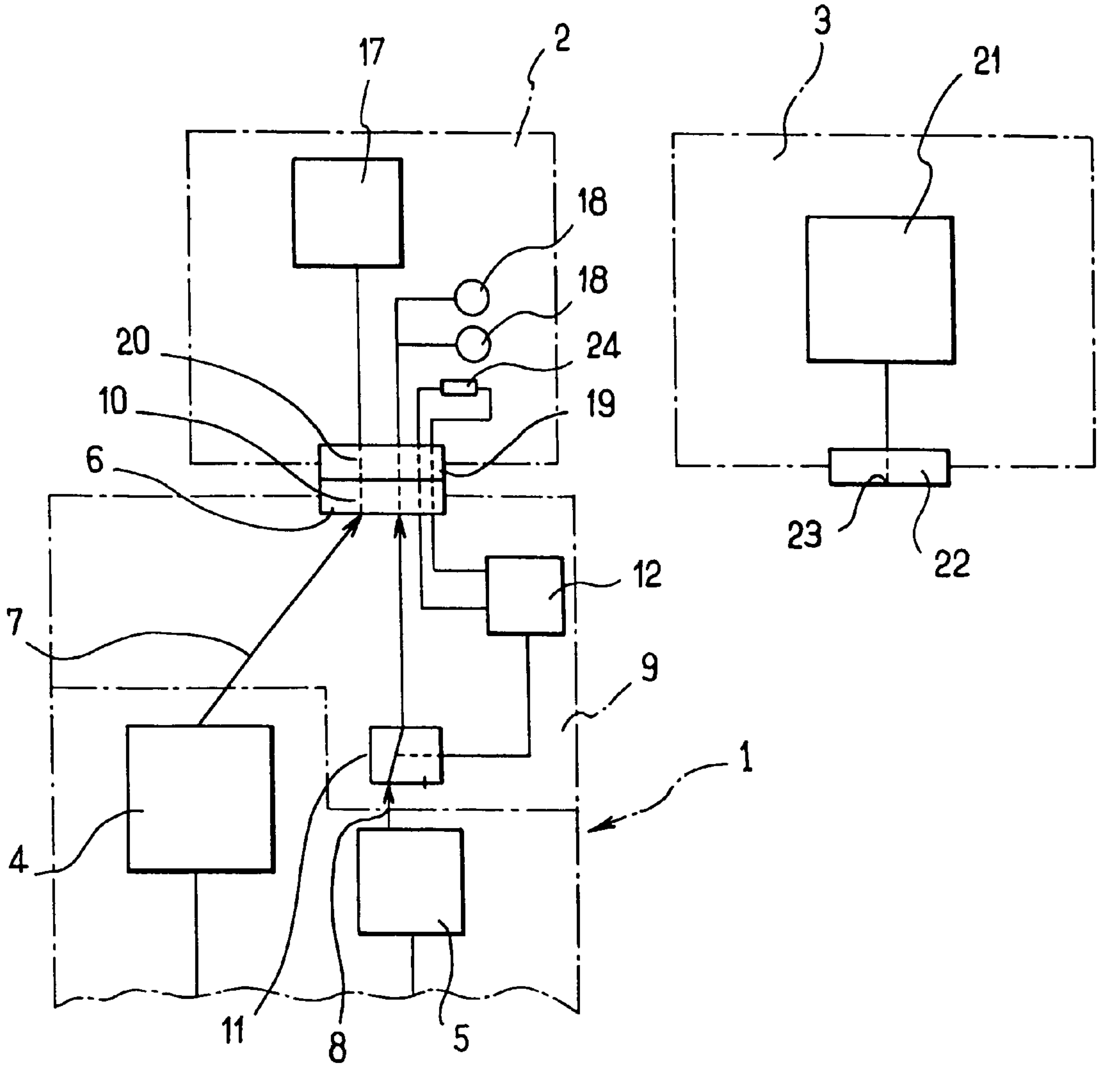
FIG. 1 is a general diagrammatic view of an electronic unit and of two screens of different first and second types suitable for connection to the electronic unit.

With reference to FIG. 1, the present invention relates to an electronic unit given overall reference 1 that is for connection, without distinction, both to a screen of a first type given overall reference 2, and to a screen of a second type given overall reference 3.

In this example, the electronic unit 1 is a computer terminal comprising in particular and in conventional manner, a mother board fitted with a processor and with random-access memory, a hard disk, a member for accessing the Internet, . . . : since these components have no direct bearing on the invention they are not shown. The electronic unit 1 also has a graphics card 4 and an audio card 5 connected to an external connection connector 6 by a display line given overall reference 7, and by a sound line given overall reference 8, forming parts of a connection device 9 for connecting the electronic unit 1 to the screens 2, 3.

The external connection connector 6 is itself known, is arranged to comply with the digital visual interface (DVI) standard, and it comprises twenty-four connector elements referenced 10.1 to 10.24 for the purposes of the present description.

Figure 2:
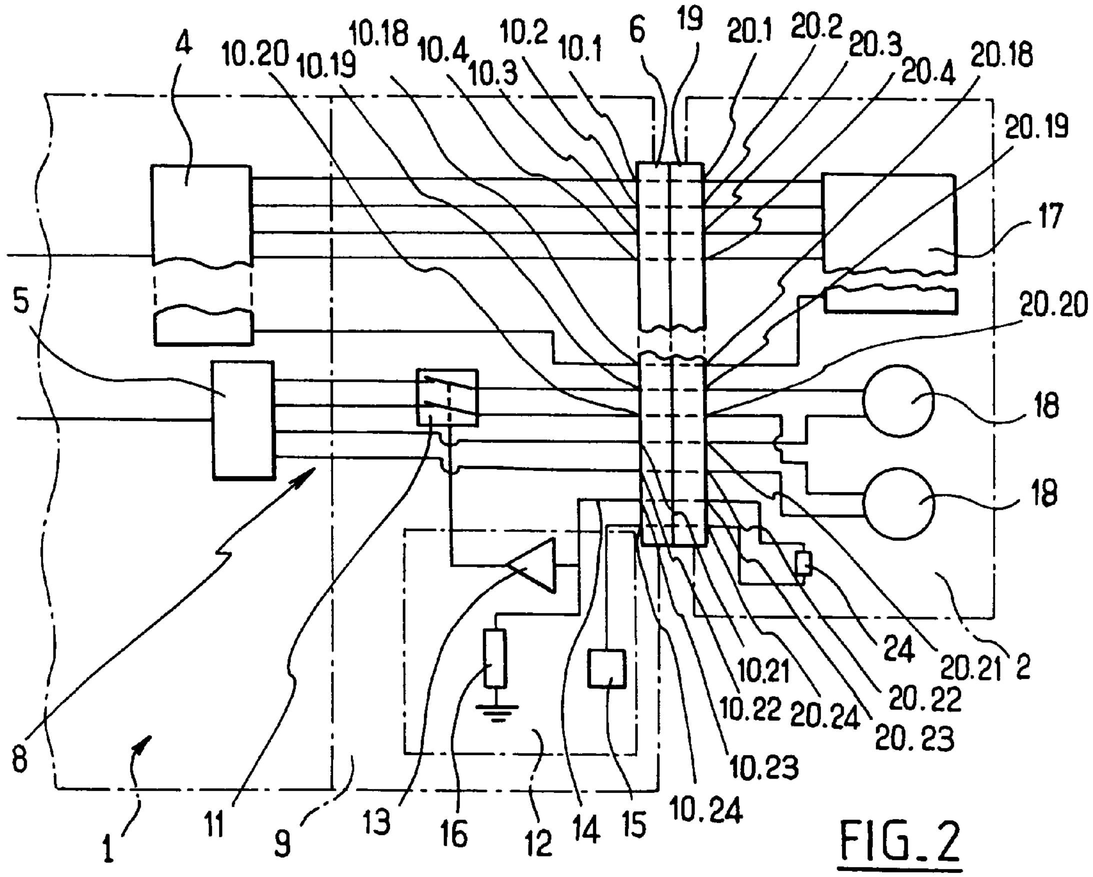
FIG. 2 is a fragmentary diagrammatic view of an electronic unit connected to a screen of the first type by a connection device in accordance with a first embodiment of the invention.

With reference also to FIG. 2, the display line 7 has eighteen conductors connected to a first series of connector elements referenced 10.1 to 10.18.

The sound line 8 has two pairs of conductors corresponding to a left audio channel and to a right audio channel, and it is arranged to transmit preamplified analog electrical audio signals. One conductor in each pair is connected directly to a respective connector element 10.21, 10.22, while the other conductor in each pair is connected to a respective input of a switch member 11 having, for each conductor, one output connected to a respective connector element 10.19 and 10.20. The switch element is constituted by an electromagnetic relay that is normally closed.

A member 12 for detecting the type of screen connected thereto is connected to the connector element 10.23 and 10.24 and to the switch member 11 to control it to occupy a connection state for connecting the conductors of the sound line to the connector elements 10.19 to 10.22, and a disconnection state for disconnecting the conductors of the sound line 8 from the connector elements 10.9 to 10.22. The detector element 12 comprises a comparator 13 having one input connected by a conductor 14 to the connector element 10.23 and an output connected to the switch member 11. The conductor 14 is connected to ground through a resistor 16. The resistor 16 has a resistance of less than 1 kilohm (kΩ). The connector element 10.24 is connected to a voltage source 15.

The connector elements 10.19 to 10.24 form a second series of connector elements.

The switch 2 comprises a display member 17, left and right loudspeakers 18, and an external connection connector 19 complying with the DVI standard, having connector elements 20.1 to 20.24 for co-operating with the connector elements 10.1 to 10.24 of the external connection connector 6.

The display member 17 is of a size smaller than 21" and it is connected to by conductors to connector elements 20.1 to 20.18 of the external connection connector 19.

One of the loudspeakers 18 is connected to the connector elements 20.19 and 20.21, and the other loudspeaker 18 is connected to the connection elements 20.20 and 20.22.

A 1 kΩ resistor 24 is connected between the connector elements 20.23 and 20.24.

The screen 3 comprises a display member 21 and an external connection connector 22 of the DVI standard. The display member 21 is of a size greater than 21" and is connected by conductors to all of the connector elements 23 of the external connection connector 22.

If the screen 3 operates at resolution greater than or equal to 2048×1536 (QXGA for quantum extended graphics array), the resistance between the terminals 23.23 and 23.24 is of the order of several megohms (mΩ).

The display line 7 is connected to the display member 17 or 21 via connector elements 10.1 to 10.8 and 20.1 to 20.18, regardless of the type of screen that is connected, i.e. screen 2 or screen 3.

When a screen 2 is connected to the electronic unit 1, the connector elements 10.23 and 10.24 are connected to the connector elements 20.23 and 20.24 which are connected to a resistor having resistance of less than 1 kΩ. This infinite resistance is detected by the comparator 13, which leaves the switch member 11 in its connection state (the switch member 11 is normally closed). The sound line 8 is thus connected to the loudspeakers 18 via the connector elements 10.19 to 10.22 and 20.19 to 20.22. Analog signals thus pass via these connector elements and are fed directly to the loudspeakers 18.

The audio signal delivered to the loudspeakers 18 is a preamplified analog audio signal. Thus, there is no need to provide an amplifier in the screen which might disturb the display member 17, nor is there any need to provide an analog-to-digital converter, with its associated electronics, that would complicate the structure of the screen.

When the screen 3 is connected to the electronic unit 1, the connector elements 10.23 and 10.24 are connected to the display member if the resolution of the screen 3 is greater than QXGA resolution. The resistance across the terminals of these elements is of the order of a few MΩ. When the comparator 13 detects such a resistance, it causes the switch element 11 to take up its disconnection state. Only the display line 7 is then connected to the display member 21. The display member 21 of resolution greater than or equal to 2048×1536 (QXGA) then operates only as a screen of resolution smaller than QXGA.

In the example described, the switch member 11 is normally closed since the computer unit 1 and the screen 2 are designed to be sold together, with a screen 3 being likely to be connected only temporarily, for repair purposes.

The preamplified electrical audio signals may have a maximum voltage of 12 volts (V). In the absence of the switch member 11 and of the detector member 12, such a voltage would run the risk of destroying the display member 21 of the screen 3 if the sound line 8 were connected to the display member 21.

It should be observed that if a screen of a third type, of resolution smaller than QXGA resolution, and not fitted with a loudspeaker, were to be connected to the electronic unit 1, then the connector elements 10.23 and 10.24 are not connected, so that the resistance between these terminals is infinite. When the comparator detects such a resistance, it causes the switch element 11 to take up the disconnected state. Only the display line 7 is then connected to the display member of the screen.

Figure 3:
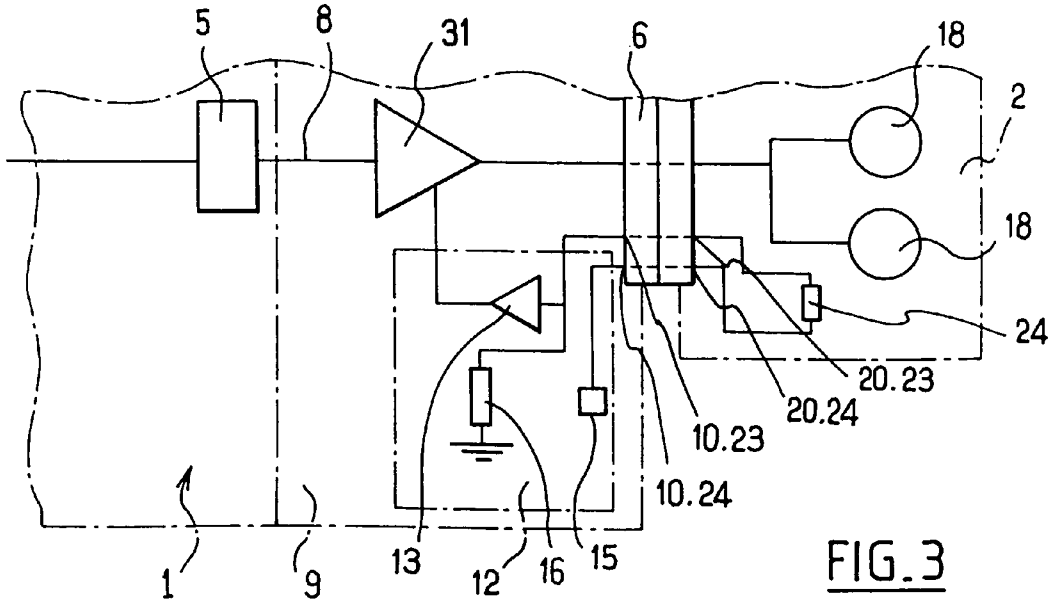
FIG. 3 is a view analogous to FIG. 1, showing an electronic unit connected to a screen of the first type by a connection device in accordance with a second embodiment of the invention.

With reference to FIG. 3, in a second embodiment, the sound line 8 is connected to the input of an amplifier member 31 having an output connected to the connector elements 10.19 to 10.22. The detector member 12 is identical to that of the first embodiment, the output from the comparator 13 being connected to the inhibit input of the amplifier member 31. It will be understood that when the comparator 13 detects a resistance greater than a few kΩ, it delivers a signal to the inhibit input, to interrupt the connection between the sound line 8 and the connector elements 10.19 to 10.22.

Naturally, the invention is not limited to the embodiment described and variant embodiments can be applied thereto without going beyond the ambit of the invention as defined by the claims.

In particular, the circuit of the connection device may be of a structure different from that described. The switch member may for example be a static relay.

When the electronic unit 1 is to be sold on its own, the switch element 11 may be normally open. On being connected to a screen 2, more electricity is then consumed than would be if the switch member were normally closed.

The invention is not limited to the DVI standard, but also applies to analogous standards.

The switch member 11 in its state for disconnecting the sound line 8 may be arranged to connect the display line 7 to the second series of connector elements 10.19 to 10.24 of the external connection connector 6.

The detector element 12 may be associated with a member for recovering an identity of the screen for connection. The identity may be contained for example in a memory of the screen and may be delivered to the display card from the first series of connector elements 10.1 to 10.18, e.g. by using a serial communications link of the digital display communication (DDC) type. In a variant, the memory may be the memory of an ID module of the screen 2 connected to the connector elements 20.23 and 20.24 so as to enable the identity of the screen to be delivered to the detector member from the connector elements 10.23 and 10.24.

What is claimed is:

1. A device for connecting an electronic unit, without distinction either to a screen of a first type or to a screen of a second type, both types of screen possessing a display member, the display member of the screen of the first type having a resolution less than a resolution of the display member of the screen of the second type, the screen of the first type also being fitted with at least one loudspeaker, the connector device comprising a display line, a sound line, and an external connection connector possessing connector elements distributed in a first series for connection to the display members of screens, and a second series for connection to the loudspeaker of the screen of the first type or to the display member of the screen of the second type, the display line being connected to the connector elements of the first series, the sound line being connected to an input of a switch member that has an output connected to the connection elements of the second series and that is controlled by a detector element for detecting the type of screen connected, the detector element comprising a comparator having an input connected by a conductor to connector elements of the connector, said conductor also being connected to ground through a resistor and said comparator haying an output connected to the switch member to control the switch member to take up a connection state in which the switch member connects the sound line to the connector when the connected screen is of the first type so that the sound line feeds the loudspeaker of said screen with an analog electrical audio signal, and a disconnection state in which the switch member disconnects the sound line from the connector when the connected screen is of the second type.

2. A device according to claim 1, wherein the switch member, in the disconnection state, connects the display line to the second series of connection elements of the external connection connector.

3. A device according to claim 1, wherein the detector element comprises a measurement element for measuring an electrical characteristic between the connector elements to which the detector element is connected.

4. A device according to claim 1, wherein the detector element is in communication with a member for recovering an identity of the screen for connection.

5. A screen comprising a display member, at least one loudspeaker, and an external connection connector, wherein the external connection connector is arranged to provide a connection of the screen to a device in accordance with claim 1, the display member is connected to a first series of connector elements of the external connection connector, and the loudspeaker is connected to a second series of connector elements of the external connection connector.

6. A screen according to claim 5, including an identity module connected to the second series of connector elements.

7. A screen according to claim 5, wherein the loudspeaker is connected directly to the second series of connector elements of the external connection connector.

* * * * *